(12) United States Patent
Smith

(10) Patent No.: US 7,194,270 B2
(45) Date of Patent: Mar. 20, 2007

(54) DYNAMIC BEAM WIDTH SELECTION FOR NON-UNIFORM DENSITY MULTIPLE ACCESS CELLS

(75) Inventor: Ronald P. Smith, Redondo Beach, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 354 days.

(21) Appl. No.: 10/674,668

(22) Filed: Sep. 30, 2003

(65) Prior Publication Data

US 2004/0072570 A1    Apr. 15, 2004

Related U.S. Application Data

(63) Continuation of application No. 09/418,866, filed on Oct. 15, 1999, now abandoned.

(51) Int. Cl.
*H04B 7/185* (2006.01)
*H04B 7/19* (2006.01)
*H04Q 7/20* (2006.01)

(52) U.S. Cl. .............. 455/446; 455/427; 455/429; 455/12.1; 455/13.2; 455/13.3

(58) Field of Classification Search ........ 455/427–430, 455/446, 12.1–13.3; 342/374; 370/321, 370/322, 326, 336, 337, 347, 442, 436, 478, 370/339
See application file for complete search history.

(56) References Cited

U.S. PATENT DOCUMENTS

| 5,533,004 A | * | 7/1996 | Jasper et al. ................. 370/204 |
| 5,754,139 A | | 5/1998 | Turcotte et al. |
| 6,366,761 B1 | * | 4/2002 | Montpetit .................. 455/12.1 |

FOREIGN PATENT DOCUMENTS

EP    0 637 895 A2    2/1995

OTHER PUBLICATIONS

First Office Action issued from European Patent Office issued on Oct. 21, 2005 for the corresponding European patent application No. 00121373.5 (a copy thereof).

* cited by examiner

*Primary Examiner*—Charles Appiah
*Assistant Examiner*—Bryan Fox
(74) *Attorney, Agent, or Firm*—Posz Law Group, PLC

(57) ABSTRACT

A communications system includes an antenna that produces a series of beams which divide a service region into a plurality of contiguous cells, and dynamically modifies cell boundaries so that the system's allocated communication spectrum is efficiently utilized.

13 Claims, 3 Drawing Sheets

DYNAMIC BEAM WIDTH SELECTION FOR NON-UNIFORM DENSITY MULTIPLE ACCESS CELLS

RELATED APPLICATIONS

The present application is a continuation application of U.S. patent application Ser. No. 09/418,866, filed Oct. 15, 1999 now abandoned.

FEDERALLY SPONSORED RESEARCH OR DEVELOPMENT

[Not Applicable]

[MICROFICHE/COPYRIGHT REFERENCE]

[Not Applicable]

BACKGROUND OF THE INVENTION

1. Field of the Invention

The present invention relates generally to a communications system and, more specifically, to optimizing the capacity of a satellite-based communications system.

2. Description of the Prior Art

Conventional satellite-based communication systems maintain an orbit above the earth and contain at least one antenna that provides coverage to an area on the earth's surface by producing a series of beams that divide the antenna's coverage area into a pattern of contiguous circular regions or cells. Operationally, an antenna beam dwells in each cell in a fixed sequential pattern to nominally cover the satellite coverage area where there are multiple users (receivers) distributed across the cells. A particular concern in conventional satellite-based systems is the efficient use of the communication spectrum allocated to a particular satellite service. Generally, the users within a satellite's coverage area are non-uniformly distributed and therefore, the coverage area or visible area of a particular antenna may contain one or more cells that are densely populated and surrounding cells that are less densely populated. Specifically, at any time, an antenna beam may service a cell where the density of users within the cell is lower than the allocated spectrum capacity and therefore, the cell's spectrum capacity is not efficiently used.

In conventional systems where time division multiple access (TDMA) protocol are used, there may be, for example, one-hundred time slots in a time frame for a six-cell coverage area. The antenna beam dwells within each cell on a frame by frame basis making available each of the one hundred time slots to a particular cell. For those cells where the user demand does not meet the one hundred time slot allocation, the remaining time slots will be quiescent. Likewise, in systems where frequency division multiple access (FDMA) protocol are used, access slots are assigned by frequency bands and the satellite's available spectrum is divided into frequency channels one through N. Using the previous example, a conventional FDMA system antenna beam may dwell within each cell of the six-cell coverage area on a frame by frame basis, making available all N frequency slots to users within a particular cell. Similar to the TDMA example, allocated communication spectrum is wasted when frequency slots are not used because of low user density within a particular cell region.

Although satellite-based communication systems, similar to those described in the previous examples, provide some level of service to all users contained within a coverage area, they are inefficient and do not optimize coverage for those cell regions which have long term high capacity demands. These inefficiencies can cause non-optimal use of communications spectrum capacity during those time periods where low-capacity areas are being serviced.

Based on techniques known in the art for satellite-based communications systems, a communications system that allows increased simultaneous coverage of users and provides higher gain when specifically covering users in high capacity areas is highly desirable.

SUMMARY OF THE INVENTION

It is an aspect of the present invention to provide a communications system that includes a satellite located in space over the earth and including an antenna disposed on the satellite. The antenna communicates radio frequency (RF) energy along a beam in a plurality of cells over a predetermined region of the earth, the cells having a predetermined boundary and being assigned a set of transmission slots where each communication slot is assignable to a selected ground user within the cell. The present invention further includes a function associated with the antenna for dynamically modifying a cell boundary in accordance with a pre-determined criteria including user service demand, where a selected cell boundary is modified to intersect the boundaries of adjacent cells. The present invention also includes the ground user terminal for communicating RF energy in a communication slot with the antenna.

It is also an aspect of the present invention to provide a method for producing a communications system. The method comprises operating a satellite including an antenna in space over the earth, where the antenna communicates radio frequency energy along a beam in a plurality of cells over a predetermined region of the earth. The cells have a predetermined shape with a predetermined boundary and an assignable set of communication slots. By assigning each communication slot to a selected ground user terminal within each cell and dynamically modifying the cell boundary in a pre-selected cell in accordance with a predetermined criteria including user service demand in adjacent cells, the pre-selected cell boundary is modified to overlap an area of the adjacent cell.

BRIEF DESCRIPTION OF THE DRAWINGS

Reference is now made to the following description and attached drawings, wherein:

FIG. 5b illustrates the top blown up view of the beam coverage area shown in FIG. 5a.

DETAILED DESCRIPTION OF THE INVENTION

The present invention relates to a communication system and, more particularly, to a satellite-based communication system that optimizes the service of users contained in a coverage area with non-uniform capacity demands. Specifically, an approach is proposed that dynamically changes the boundary of a cell contained within an antenna coverage area to more efficiently service all users. The system may use a narrower beam width covering only the high demand users for a time interval and then change to a wide beam width covering the entire area of both high-demand and low-demand users. By rapidly alternating between beam widths, all users (high and low demand) can be serviced while the beam is wide and the high-demand users can be provided with additional service during the periods when a narrow beam is being used.

Figure 1:
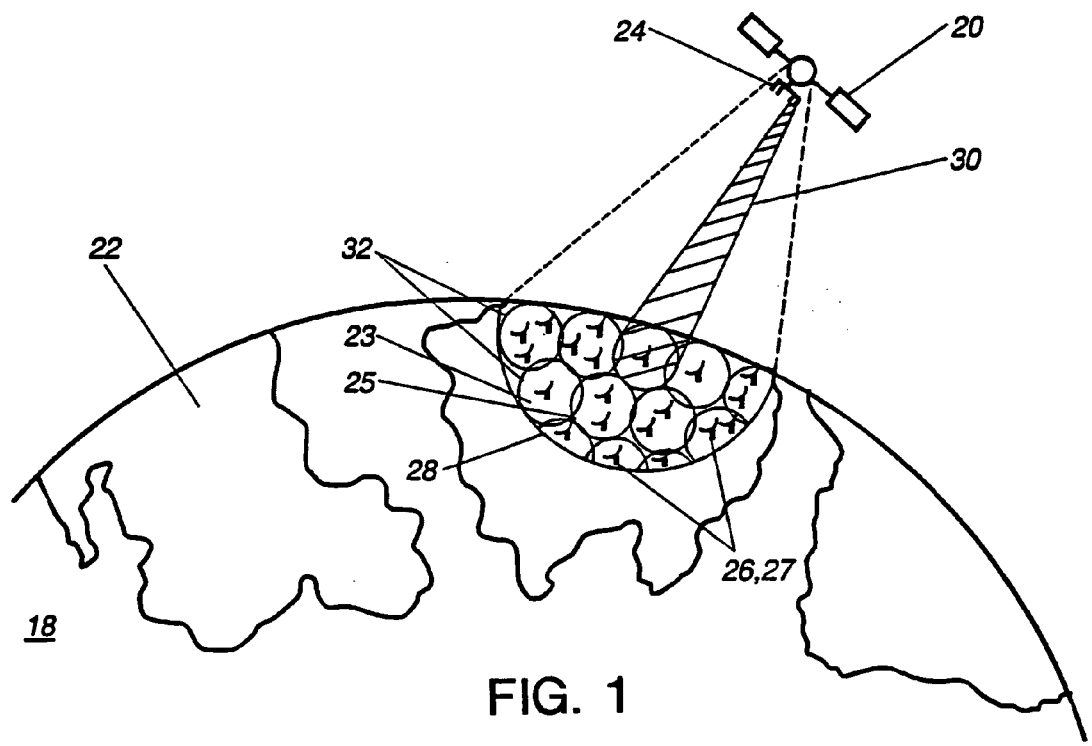
FIG. 1 illustrates a satellite-based multiple access communications system according to the present invention.

Referring to FIG. 1, the preferred embodiment of the present invention includes a satellite 20 in orbit above the surface of the earth 22 and an antenna 24 that provides a communications link with users 26 who have a user terminal 27 for transmitting RF signals to the satellite 20 and receiving RF signals from the satellite 20 within a coverage area 28. The user terminal 27 would typically be a fixed service satellite (FSS) type terminal such as for high speed internet connection, but may also be any unit having transceiver capabilities. The antenna 24 produces a series of beams 30 that divide the coverage area 28 into a pattern of contiguous cells 32 where each beam 30 services some portion of the cells 32. The boundaries of the cells 32 are predetermined based on a default beam configuration and later may be dynamically re-allocated according to capacity demands across adjacent cells 32 of the coverage area 28. For the purposes of the preferred embodiment, the antenna 24 is a phased-array antenna and may alternatively be a multi-beam or similar antenna having the ability to radiate multiple beams 30 that would service corresponding cells 32. The satellite system 18, illustrated in FIG. 1, may be a geostationary earth orbiting (GSO) system or a non-geostationary earth orbiting (NGSO) system that includes, but is not limited to, a low earth orbit (LEO), a highly elliptical orbit (HEO), or a medium earth orbit (MEO). These satellite systems may use a multiple access protocol that includes, but is not limited to, time division multiple access (TDMA) and frequency division multiple access (FDMA).

Figure 2:
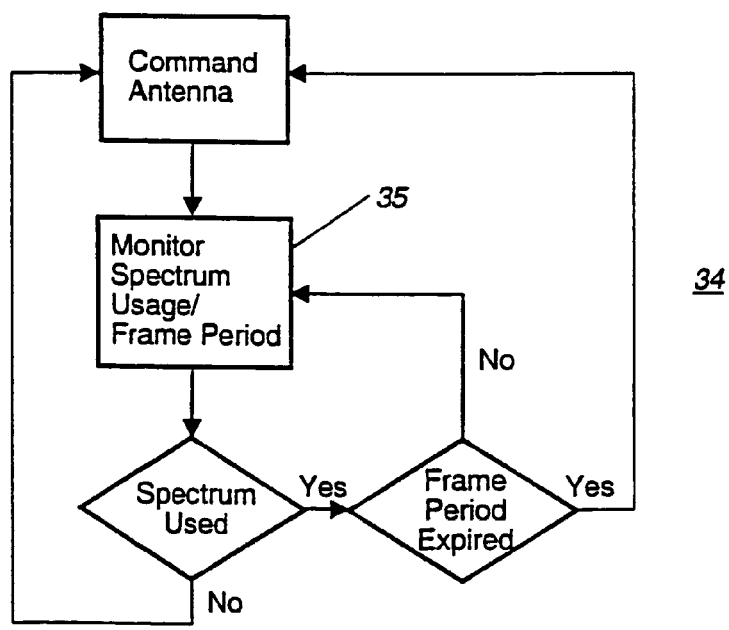
FIG. 2 illustrates a block diagram of the antenna processor of the communications system of FIG. 1.

As previously mentioned, satellite-based communication systems contain at least one antenna that provides coverage to an area on the earth's surface by producing a series of beams that divide the antenna's coverage area into a pattern of contiguous circular regions or cells. Referring to FIGS. 1 and 2, the satellite 20 contains an antenna processor 34 that commands the antenna 24. An antenna beam dwells in each cell in a sequential pattern to nominally cover the satellite coverage area. The processor 34 commands the antenna 24 to form a beam 30 having a pointing that produces a cell footprint 23 on the ground and, similar to conventional systems, the beam 30 dwells within the cell 23 for some frame period, servicing users 26 within the cell 23, until expiration of the frame period where the beam 30 is commanded to scan to the next cell 25 in sequence. Based on the spectrum utilization determined by an access control function 35, and as a result of the processes that will be described hereinafter, the processor 34 may command the antenna 24 to reform the beam 30 from a default cell geometry to a larger modified cell geometry. In the case of a phased array antenna, this is accomplished by changing the amplitude weights and phase shifts to form the desired beam shape. The interface from the processor 34 connects to an antenna controller that handles the details of the amplitude weights and phase shifts based on parameters such as azimuth, elevation and beam width, commanded by the processor 34. The beam can be steered from cell to cell. Similar changes in beam pointing and beam width may be made in other types of antennas depending on the particular antenna design. The modified cell geometry allows a more efficient use of the communications spectrum. However, the larger cell geometry also increases the beam width or diameter, thereby decreasing the gain of the beam. To vitiate the loss in gain the ground transmitters may also have to use more power or transmit at a lower data rate at the same power.

Figure 3:
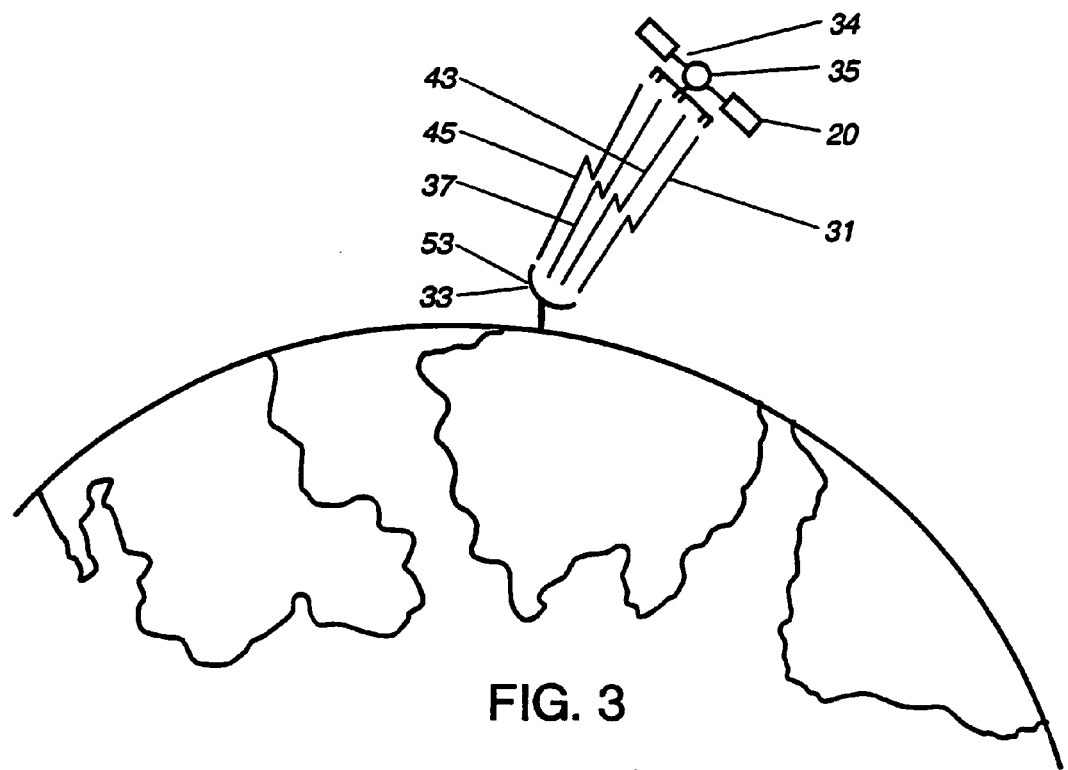
FIG. 3 illustrates an access control function according to the present invention.
Figure 4:
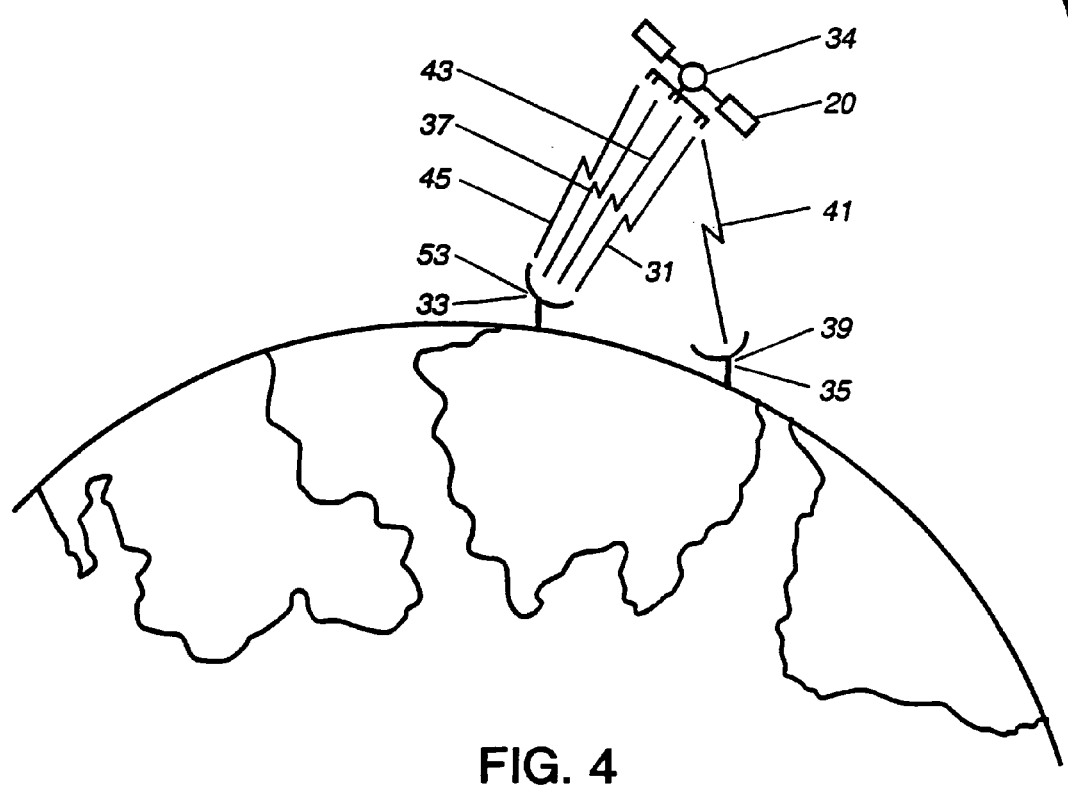
FIG. 4 illustrates an alternative access control function according to the present invention.

Referring to FIG. 3, a new user 33 communicates access request data through an uplink access channel 37 to the access control function 35, indicating the type of service it desires such as data rate and priority. The uplink access communication channel 37, separate from the main user communications channels 31, is defined for new users to acquire access to the system 18. This access channel 37 may use a standard contention protocol, such as Slotted Aloha (The Communications Handbook, J. D. Gibson Editor, CRC Press, 1997, ISBN 0-8493-8349-8, p. 640) to allow random access of all users to the access channel 37. If the access control function 35 is at a ground station 39, as illustrated in FIG. 4, the satellite 20 forwards messages received from a user 33 via the access channel 37 to the ground station 39. The satellite 20, receives responses containing access control information from the ground station 39 through separate control communication channels 41 and forwards the responses to the user 33 and to the processor 34.

The access control function 35, as previously mentioned, monitors the communications usage within a cell to determine whether there are unused access slots among the allocated cell communications spectrum. The access control function 35 is preferably located on board the satellite within the processor 34, however, it may alternatively be located at a ground station control center. The access control function 35 maintains a database of all assigned satellite communication channels and all available satellite resources. From this database the access control function 35 can determine if resources are available to meet a given request. If there are not sufficient resources available to service a new request, the new user must wait until an existing user releases the resources allocated to it. A low priority may be defined that allows the access control function 35 to terminate a low priority allocation in order to service a higher priority request. The access control function 35 keeps a record of pending requests and fills the request, as resources become available. The order in which requests are filled is based on the priority requested and the chronological order in which the requests were received.

In the preferred embodiment of the present invention, existing users 33 may use the uplink access communication channel 37 to make changes to their service requests, such as changing data rate and priority or terminating a connection. In an alternate embodiment of the present invention, existing users may use a separate dedicated request channel 45, allocated when their main communication channel 31 is allocated, instead of the uplink access communication channel 37.

A downlink access communication channel 43 is used to send responses back to both new users 53 requesting access and existing users 33. These responses command the users 53 and 33 to communicate in specific slots, as well as any other necessary information such as the particular satellite antenna gain for given slots. The access control function 35 uses the downlink access communication channel 43 to allocate resources to new users 53 as well as change allocations to existing users 33. Prior to a change in an access parameter, the access control function 35 uses the downlink access communication channel 43 to inform all affected users when it anticipates a change in an access parameter (e.g. a change in the gain of the satellite antenna or specifying slots to communicate in). In this way, the access control function 35 is free to make changes to all user allocations in order to optimize the efficiency of the system.

Using the access information described above, the access control function 35 monitors the number of users in each cell, the number of slots allocated to each cell and the number of new users waiting for access in each cell, and stores the information in a database. The access control function 35 computes the efficiency of the system based on the total number of slots allocated across all cells. The access control function 35 also calculates the efficiency of the system for a number of alternative scenarios involving different cell geometries that are possible by changing the antenna beam width and the duration that the antenna dwells in each cell. If the access control function 35 determines that one of the alternative scenarios achieves a performance higher than the current allocation by some predefined amount, the access control function 35 communicates allocation changes to all affected users via the downlink access communication channel 43 and to the processor 34. The performance differential is selected in order to balance the benefit of improved system efficiency with the cost of transmitting commands to all affected users in order to change allocations. Additionally, user priority level may be included in the access monitoring and used as a weighting to compute the system efficiency. While the previous description is the preferred implementation, any number of alternative approaches can be used to define the system efficiency and provide an optimization of total capacity and fair coverage for all areas within the satellite footprint.

Figure 5A:
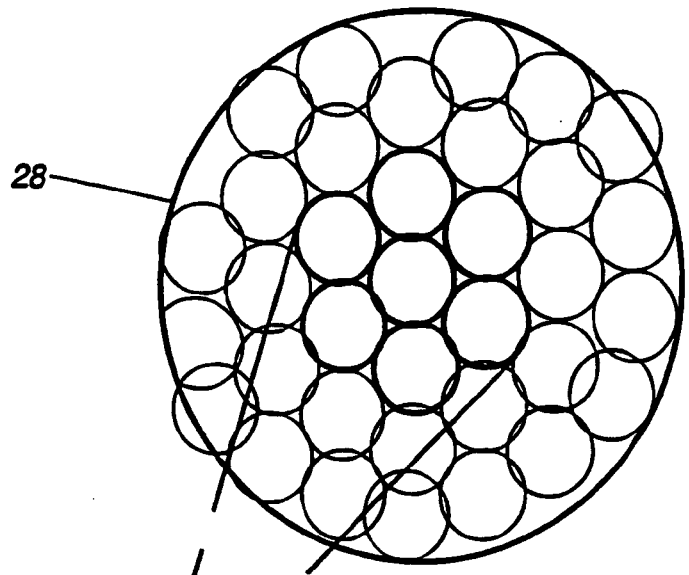
FIG. 5a illustrates the top view of a satellite coverage area and associated beam coverage area according to the present invention.
Figure 5B:
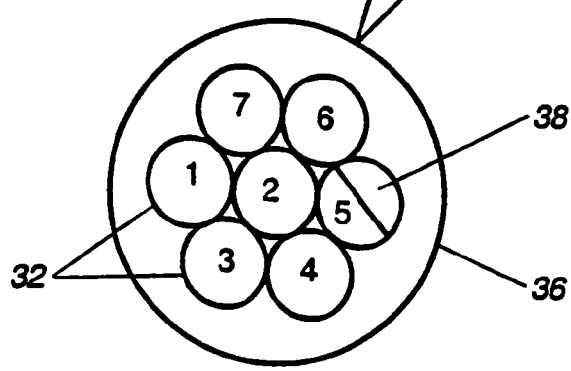
Figure 5C:
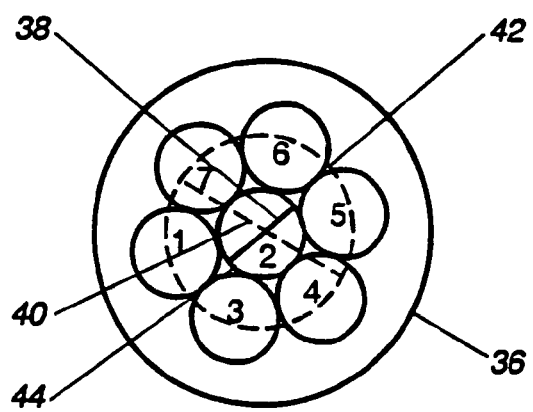
FIG. 5c illustrates a detailed top view of the modified beam coverage area shown in FIGS. 5a and 5b.

Referring to FIGS. 5a through 5c, the preferred embodiment of the present invention is described in the context of a FDMA satellite-based communication system. FDMA takes the frequency spectrum (bandwidth) allotted to a communications system and divides it into smaller segments and assigns each segment to an individual user, thereby providing multiple users simultaneous access across a fixed bandwidth. Referring to FIG. 5a, for example, the system has 10 MHz of available communication spectrum, four simultaneous phased-array antenna beams, one-hundred channels (frequency access slots) per beam frame period and a seven-cell reuse pattern 36 per beam. The seven-cell reuse pattern 36 is illustrated in FIG. 5b having cells 32 numbered one through seven where the user density is greatest in cell one and where the predetermined default diameter 38 of each of the seven cells 32 is d kilometers. If, for example, as illustrated in FIG. 5c, the beam has just scanned from cell one to cell two, and the access control function 35 determines that only twelve of the one-hundred allotted frequency access slots are being utilized in cell two, the processor 35 may dynamically modify the cell two geometry. The cell two geometry is modified by increasing the default diameter 38 from d to a modified diameter d' 40 where d'=d+Δd and d' intersects the boundaries of adjacent cells one and three through seven. The eighty-eight remaining cell two frequency slots then may be apportioned between users in the adjacent cells for users within the modified cell boundary 42. For example, sixty-eight slots may be assigned to users in cell one because of high user demand, and four users in each of cells three through seven may be assigned to the remaining twenty slots. The protocol for assignment of access slots in the adjacent cells may be handled in the same manner as was previously described. Also, as previously described, the assignment of access slots may be performed on board the satellite or at a ground control center depending on the design of the system. The cell boundary 42 remains modified until the antenna processor 34 commands the antenna to narrow the beam to its normal boundary 44 either based on some predetermined expiration of time or as determined by the previously described optimization computation. It is important to note that the modified cell diameter d' 40 may not be so large so as to exceed the frequency re-use band allocated for a particular beam, to avoid co-channel interference with the remaining beams of the satellite system.

Referring again to FIGS. 5a through 5c, an alternate embodiment of the present invention is illustrated using a TDMA satellite-based communication system. In TDMA, each user has access to the entire authorized frequency spectrum band to transmit a short burst of data. TDMA increases the channel capacity by chopping the signal into segments and assigning each segment to a different time slot whereby a single channel can handle multiple users simultaneously. Referring to FIG. 5a, the system has 10 MHz of available communication spectrum, three simultaneous phased-array antenna beams, three-hundred channels (time access slots) per beam frame period and a seven-cell reuse pattern per beam. The seven-cell reuse pattern is illustrated in FIG. 5b having cells numbered one through seven where the user density is greatest in cell one and where the predetermined default diameter 38 of each of the seven cells 32 is d kilometers. If, for example, as illustrated in FIG. 5c, the beam has just scanned from cell one to cell two, and the antenna processing element determines that only one-hundred-eighty of the three-hundred allotted time access slots are being utilized in cell two, the processor may dynamically modify the cell two geometry. The cell two geometry is modified by increasing the default diameter 38 from d to a modified diameter d' 40 where d'=d+Δd and d' 40 intersects the boundaries of adjacent cells one and three through seven. Similar to the FDMA illustration, the one-hundred-twenty remaining cell two time slots may then be apportioned between users in the adjacent cells (one and three through seven) that are within the modified cell two boundary 42.

Obviously, many modifications and variations of the present invention are possible in light of the above teachings. Thus, it is to be understood that, within the scope of the appended claims, the invention may be practiced otherwise than as specifically described above.

The invention claimed is:

1. A satellite-based method for rapidly altering the size of a communication cell in response to bandwidth demands, said method including:

transmitting a plurality of radio frequency (RF) beams from a satellite-based transmitter to establish a corresponding plurality of communication cells, each of the plurality of communication cells having an assignable set of communication slots capable of servicing a plurality of users in a coverage area during a frame time interval, the plurality of users including first users having a high demand and second users having a low demand, the first users assigned a first group of the assignable set of communication slots and the second users assigned a second group of the assignable set of communication slots;

establishing a first size for a first communication cell associated with one of the plurality of RF beams based on a first bandwidth demand associated with the first users;

determining a second size for said first communication cell associated with the one of the plurality of RF beams based on a second bandwidth demand associated with the second users; and rapidly altering the size of said first communication cell from said first size to a second size during the second group of the assignable set of communication slots and from said second size to said first size during the first group of the assignable set of communication slots, by adjusting one or more beam forming parameters associated with the one of the plurality of RF beams.

2. The satellite-based method of claim 1, wherein a terminal in a communication cell adjacent to said first communication cell makes a bandwidth request, wherein said bandwidth request has a priority level, wherein said step of altering said size of said first communication cell is based part on said priority level.

3. The satellite-based method of claim 1, wherein said second size of said first communication cell overlaps on at least one communication cell adjacent to said first communication cell.

4. A satellite-based method for rapidly altering the size of a communication cell in response to bandwidth demands, the communication cell having an assignable set of communication slots capable of servicing a plurality of users in a coverage area during a frame time interval, the plurality of users including first users having a high demand and second users having a low demand, the first users assigned a first group of the assignable set of communication slots and the second users assigned a second group of the assignable set of communication slots, said method including:

determining a first size for the communication cell based on the high demand associated with the first users;

determining a second size for the communication cell based on the high demand of the first users and the low demand of the second users; and rapidly altering the size of the communication cell from said first size to said second size during the second group of the assignable set of communication slots and from said second size to said first size during the first group of the assignable set of communication slots.

5. The satellite-based method of claim 4, wherein a terminal associated with one of the users in the communication cell makes a bandwidth request, wherein said bandwidth request has a priority level, wherein said step of rapidly altering said size of the communication cell is based in part on said priority level.

6. A satellite-based method for rapidly altering the size of a communication cell in response to bandwidth demands, the communication cell having an assignable set of communication slots capable of servicing a plurality of users in a coverage area during a frame time interval, the plurality of users including first users having a high demand and second users having a low demand, the first users assigned a first group of the assignable set of communication slots and the second users assigned a second group of the assignable set of communication slots, said method including:

determining a first size for a communication cell based on the high demand associated with the first users;

determining a second size for said communication cell based on the high demand of the first users and the low demand of the second users; and rapidly altering the size of said communication cell from said first size to said second size during the second group of the assignable set of communication slots and from said second size to said first size during the first group of the assignable set of communication slots, said second size of said communication cell overlapping on at least one communication cell adjacent to said communication cell.

7. The satellite-based method of claim 6, wherein a terminal associated with one of the plurality of users in said communication cell makes a bandwidth request, wherein said bandwidth request has a priority level, wherein said altering step is based in part on said priority level.

8. A satellite-based method for rapidly altering the size of a communication cell in response to bandwidth demands, the method comprising:

transmitting a plurality of beams from a transmitter to establish a corresponding plurality of communication cells, each of the plurality of communication cells having an assignable set of communication slots capable of servicing a plurality of users in a coverage area during a frame time interval, the plurality of users including first users having a high demand and second users having a low demand, the first users assigned a first group of the assignable set of communication slots and the second users assigned a second group of the assignable set of communication slots;

establishing a first size for one of the plurality of communication cells with one of the plurality of beams based on the high demand associated with the first users;

determining a second size for the one of the plurality of communication cells based on the high demand associated with the first users and the low demand associated with the second users; and rapidly altering the size of the one of the plurality of communication cells during the frame time interval from the first size to the second size during the second group of the assignable set of communication slots and from the second size to the first size during the first group of the assignable set of communication slots by adjusting the one of the plurality of beams.

9. The satellite-based method according to claim 8, wherein the assignable set of communication slots is associated with a frequency division multiple access (FDMA) communication protocol.

10. The satellite-based method according to claim 8, wherein the assignable set of communication slots is associated with a time division multiple access (TDMA) communication protocol.

11. A satellite-based method for rapidly altering the size of a communication cell in response to bandwidth demands, the communication cell having an assignable set of communication slots capable of servicing a plurality of users in a coverage area during a frame time interval, the plurality of users including first users having a high demand and second users having a low demand, the first users assigned a first group of the assignable set of communication slots and the second users assigned a second group of the assignable set of communication slots, the method comprising:

determining a first size and a first downlink power level for the communication cell based on the high demand associated with the first users;

determining a second size and a second downlink power level for the communication cell based on the high demand of the first users and the low demand of the second users; and rapidly altering the size and a downlink power level of the communication cell from the first size and the first downlink power level to the second size and the second downlink power level during the second group of the assignable set of communication slots and from the second size and the second downlink power level to the first size and the first downlink power level during the first group of the assignable set of communication slots.

12. The satellite-based method according to claim 11, wherein the assignable set of communication slots is associated with a frequency division multiple access (FDMA) communication protocol.

13. The satellite-based method according to claim 11, wherein the assignable set of communication slots is associated with a time division multiple access (TDMA) communication protocol.

* * * * *